No. 803,304. PATENTED OCT. 31, 1905.
W. J. MUNCASTER & L. A. FLETCHER.
GRINDING MACHINE.
APPLICATION FILED DEC. 20, 1904.

Witnesses
J. Stewart Rice
J. B. Malnato

Inventors:
Walter J. Muncaster,
Lawrence A. Fletcher,
By Dodge & Sons,
Attorneys.

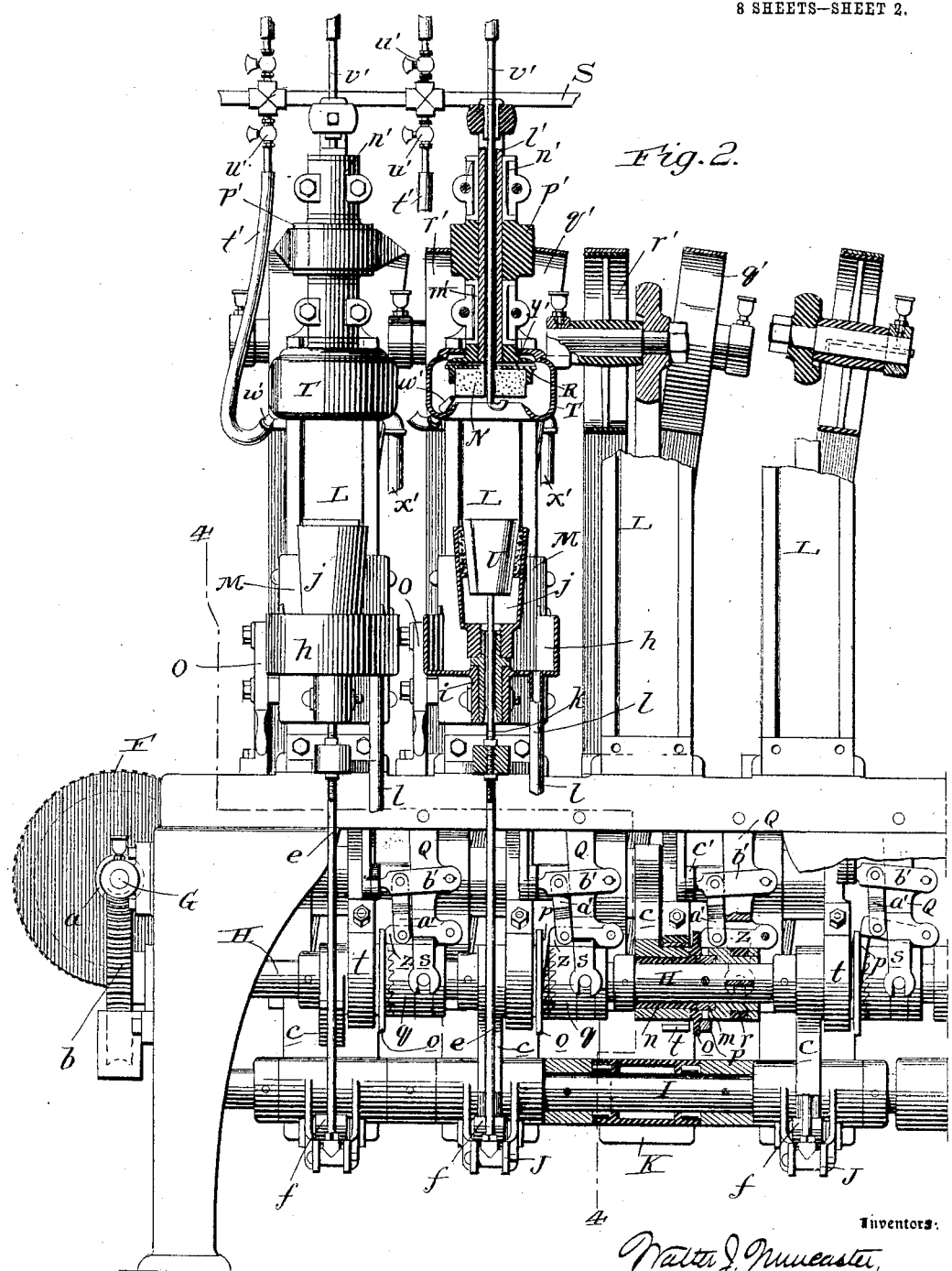

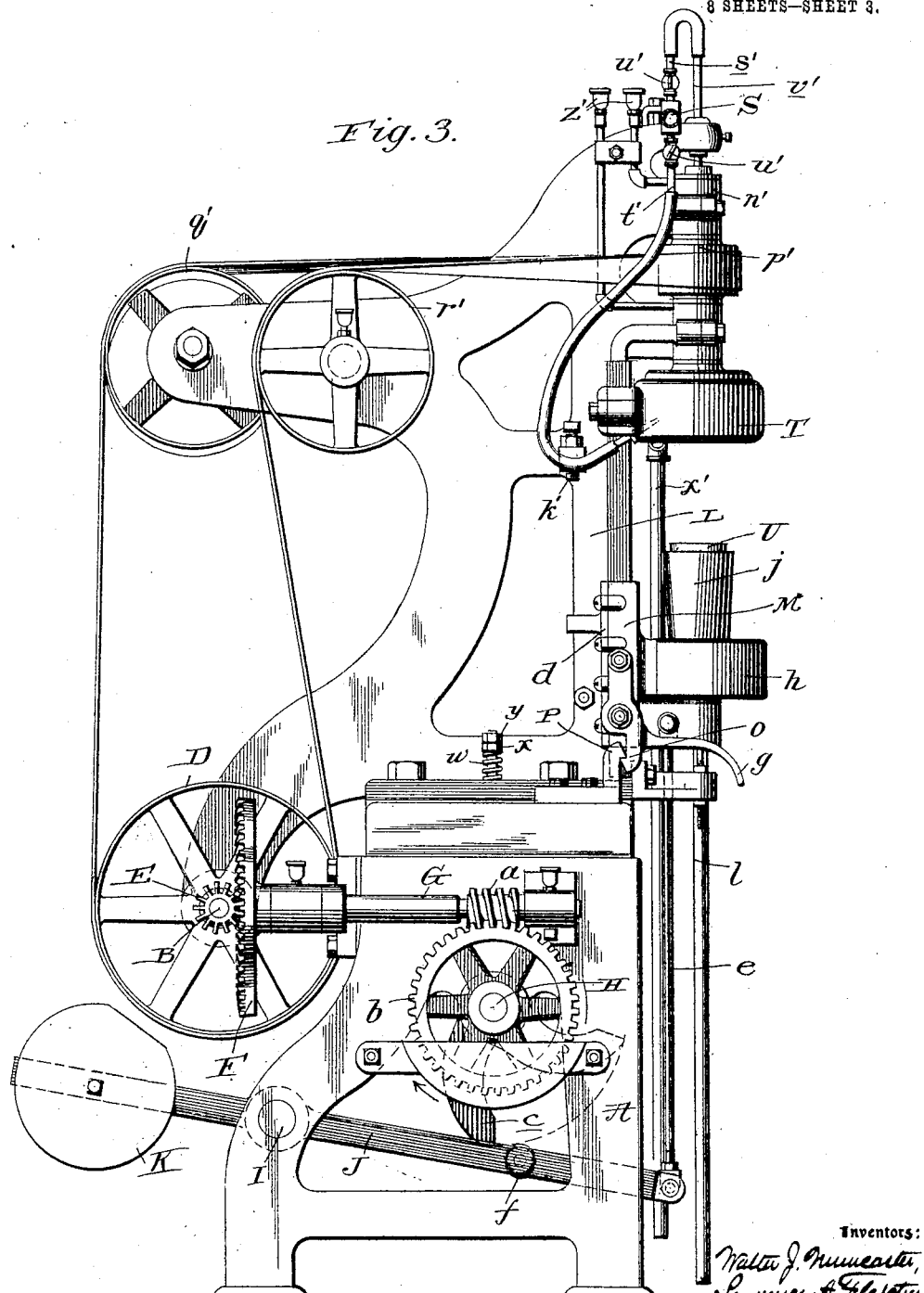

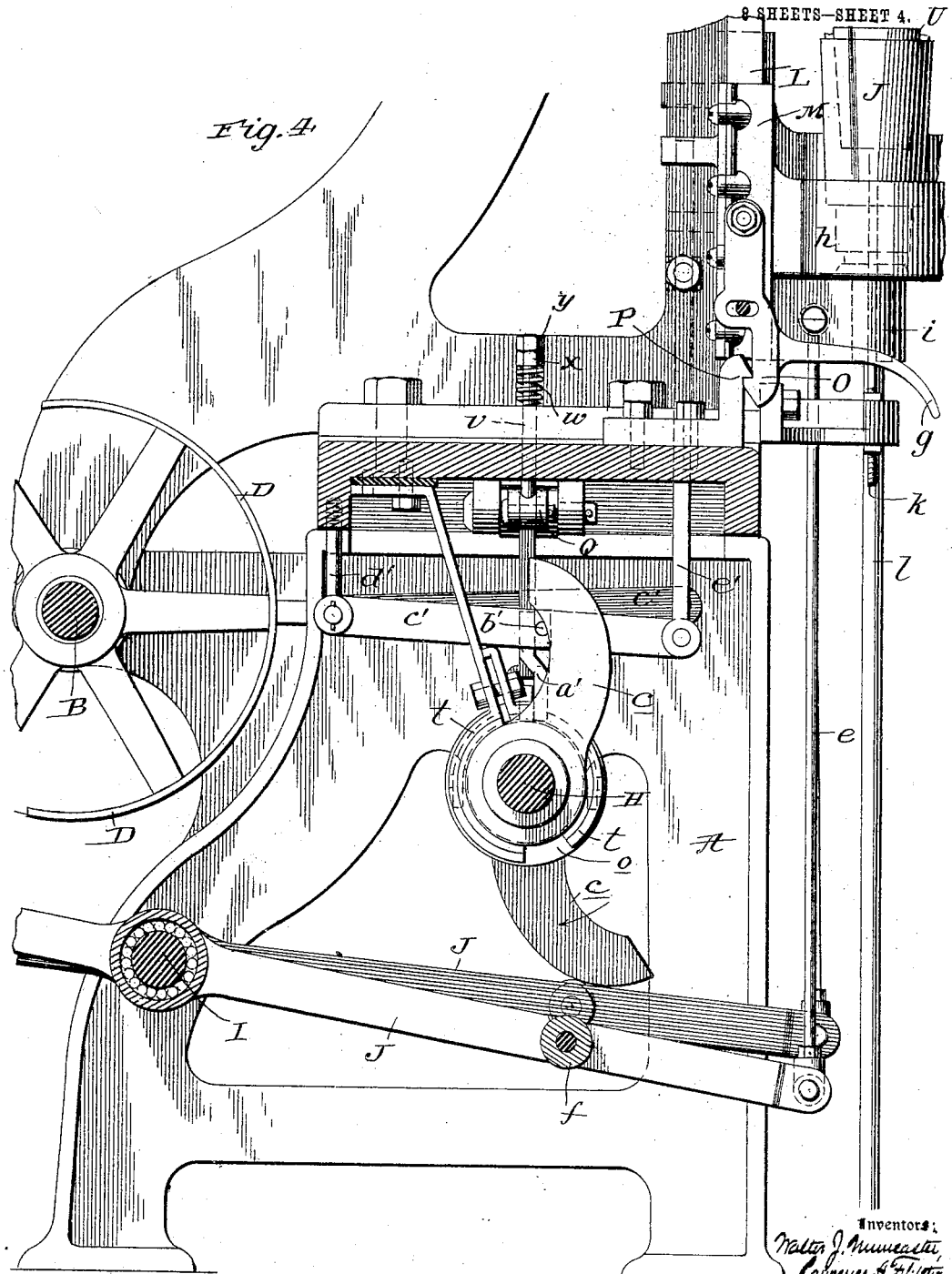

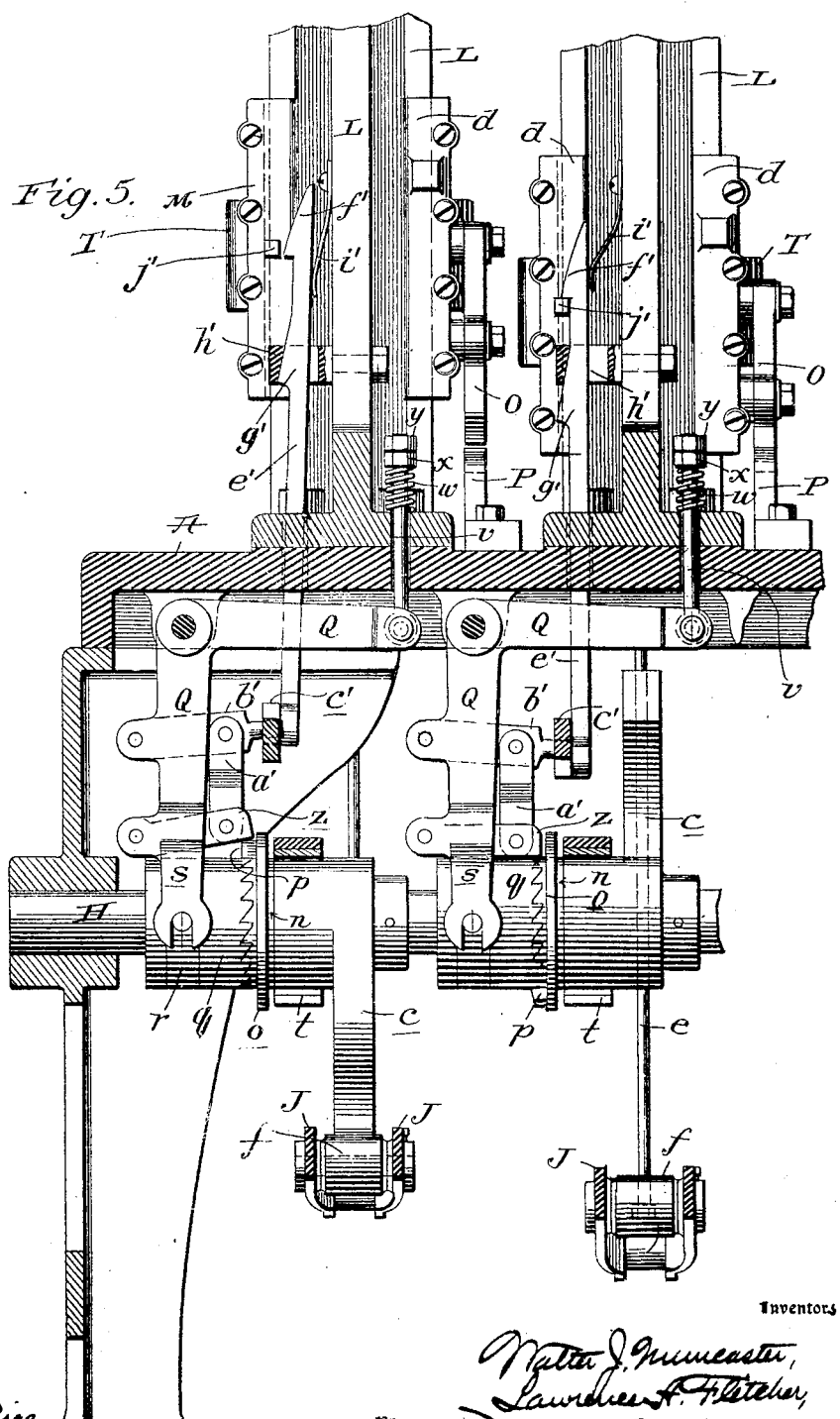

No. 803,304. PATENTED OCT. 31, 1905.
W. J. MUNCASTER & L. A. FLETCHER.
GRINDING MACHINE.
APPLICATION FILED DEC. 20, 1904.
8 SHEETS—SHEET 6.
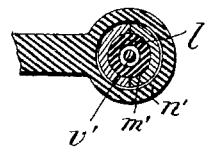
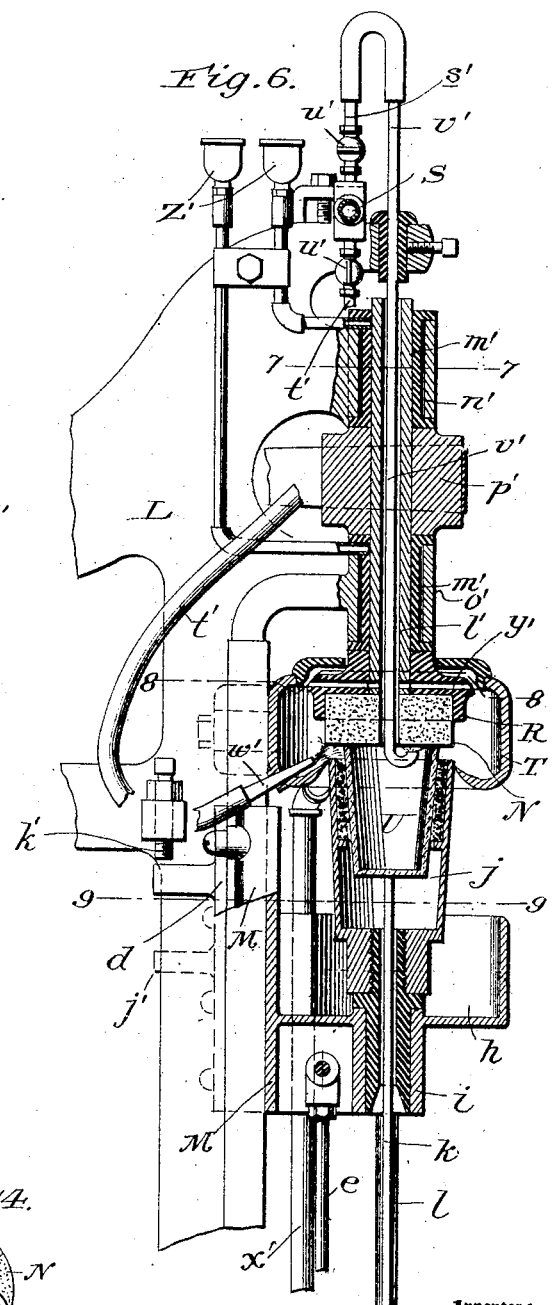
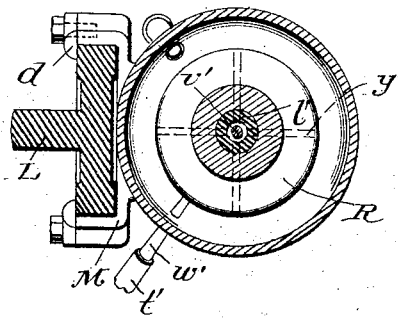
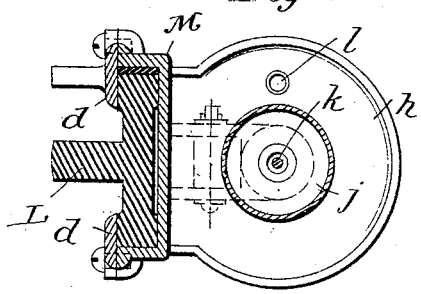
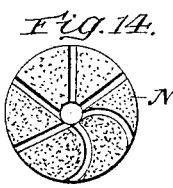

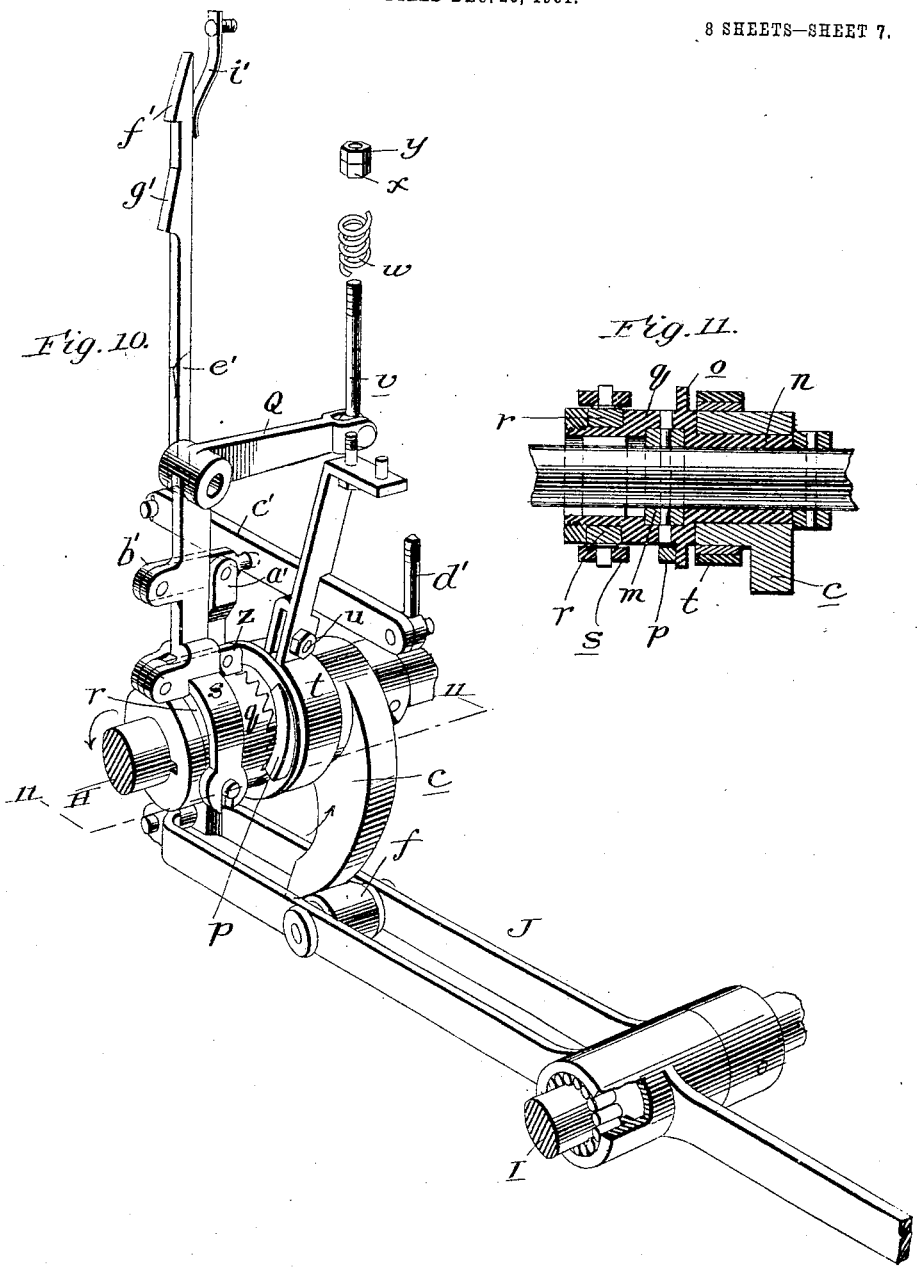

No. 803,304. PATENTED OCT. 31, 1905.
W. J. MUNCASTER & L. A. FLETCHER.
GRINDING MACHINE.
APPLICATION FILED DEC. 20, 1904.

UNITED STATES PATENT OFFICE.

WALTER J. MUNCASTER AND LAWRENCE A. FLETCHER, OF CUMBERLAND, MARYLAND.

GRINDING-MACHINE.

No. 803,304.   Specification of Letters Patent.   Patented Oct. 31, 1905.

Application filed December 20, 1904. Serial No. 237,697.

*To all whom it may concern:*

Be it known that we, WALTER J. MUNCASTER and LAWRENCE A. FLETCHER, citizens of the United States, residing at Cumberland, in the county of Allegany and State of Maryland, have invented certain new and useful Improvements in Grinding-Machines, of which the following is a specification.

This invention pertains to a machine for grinding the mouths or edges of tumblers and like glasses; and it consists in various novel features, details, and combinations hereinafter set forth.

The invention is susceptible of considerable variation as to its details, and some of the modifications will be set forth herein; but it will first be described in its more complex form and later with some of the special devices and features omitted.

In the accompanying drawings, Figure 1 is a perspective view of the complete machine looking at the rear side. Fig. 2 is a front elevation with portions broken away and others in section to better illustrate details of construction; Fig. 3, an end elevation; Fig. 4, a vertical cross-section on the line 4 4 of Fig. 2; Fig. 5, a sectional view illustrating the construction and operation of the clutch-mechanism; Fig. 6, a vertical sectional view of the grinder, glass-holder, and associated parts; Figs. 7, 8, and 9, horizontal sections on the lines 7 7, 8 8, and 9 9, of Fig. 6; Fig. 10, a perspective view of the clutch mechanism, cam, and lever for elevating the glass and holding it against the grinding-wheel; Fig. 11, a sectional view of the clutch and cam-hub; Fig. 12, a vertical cross-section of a modified form of the machine, showing only the cam-shaft, its cams, and immediately-associated parts; Fig. 13, a view of the shaft and its cams in the modified form; Fig. 14, a face view of the grinding-disk provided with water-discharging channels of straight and curved form in its face.

In the manufacture of glasses, particularly tumblers, it is customary to grind the upper edge to make it true and thereafter to subject it to heat sufficient to obliterate the marks of the grinder and give a smooth "fire-finish." The grinding is an item of considerable expense owing to the relatively limited capacity of machines commonly employed for the purpose, and it often happens that the grinding is carried too far and the glass thereby made unduly short or that it is not carried far enough, in which case an imperfect glass is produced. Our invention aims to overcome these faults, to insure a due and proper grinding, and to withdraw the glass or arrest the grinding operation when it has proceeded long enough. This we accomplish whether the attendant be at hand to remove the glass when the work has proceeded to the proper point or the glass be left in the holder and the machine be permitted to run for a longer or shorter time unattended.

Among other objects sought is the convenient insertion and removal of glasses, whereby a great number of glasses may be ground in a given time. Various other advantages are secured by our improved construction, as will appear from the following description and explanation.

Referring to the drawings, A indicates a substantial frame, advisably of metal, having at its rear side suitable boxes or bearings for a main driving-shaft B, which receives power from any convenient prime motor through a belt-wheel C or in other usual way.

Upon the shaft B are placed band-wheels D, equal in number to the grinding-wheels and glass-holders employed. At one end the shaft B carries a miter-pinion E, which meshes with a miter-gear F, carried by a shaft G, journaled in boxes or bearings at one end of the frame A, both shafts being horizontally arranged. Shaft G is formed or furnished with a worm or screw $a$, which meshes with and rotates a worm-wheel $b$, carried by the cam-shaft H, which latter is carried in suitable bearings in frame A and extends lengthwise thereof, parallel with shaft B.

Below and to the rear of cam-shaft H is a cylindrical rod or piece of shafting I, preferably secured at its ends in the end castings of frame A in a manner to hold it against rotation and to assist in bracing or tying together said frame. It may, however, be free to turn, its purpose being primarily to support and form a fulcrum for a series of levers J, by which the glass-holders are raised and lowered. There is one lever J for each glass-holder and each is provided at its rear end with a weight K sufficient to depress said end, and hence to elevate the forward end with the glass-holder and other parts connected with said forward end.

Cam-shaft H carries a series of cams $c$, one for each lever J, which if they be secured directly to the shaft will be preferably set at equal angular distances around the shaft— that is to say, as many degrees apart, measured around the shaft, as the number of cams will go times into three hundred and sixty. There being four cams represented in the drawings, they are set ninety degrees apart, measuring around the shaft; but the number of degrees will or may vary with the number of cams. We will first, however, describe a construction in which the cams are not rigidly fixed to the shaft.

Rising from the base or main frame A are standards or upright frames L equal in number to the cams, levers, glass-holders, or grinders and of substantially T form in horizontal section, the front of each standard constituting the head or top bar of the T. This front face or portion of each standard constitutes a guideway for a vertically-movable carriage or slide M, provided with retaining-plates $d$, which, with the body of the slide, clasp or fit around the edges of the guideway, as best shown in Figs. 8 and 9.

Each carriage M is elevated and supported by one of the weights K, acting through the medium of a lever J and connecting-rod $e$, pin-jointed at its ends to the carriage and to the lever. The weight K is sufficient to elevate the carriage M, with the glass-holder and other parts carried by it, and the glass, and to press and hold the glass with proper force against the grinding wheel or disk N. To regulate and vary the pressure as desired, we arrange the weights to move or slide upon the rear arms of levers J and secure them at any desired adjustment by set-screws or equivalent fastenings, as seen in Figs. 3 and 12.

Levers J are preferably formed with two parallel forwardly-projecting arms, as shown in Figs. 2, 5, and 10, with a bowl or roller $f$ placed between them in position to be acted upon by a cam $c$, carried by the cam-shaft H. Each cam $c$ during the lower portion of its travel bears upon one of the bowls or rollers $f$ and depresses the lever J which carries it, thereby drawing down the carriage M connected with said lever.

It is desirable that when lowered each carriage M shall be locked against rising until the attendant shall release it. This is usually done only after a finished glass is removed from the chuck or holder and another one is substituted, though the same glass may be subjected to further grinding if deemed desirable. To thus lock or hold the carriages M, each is furnished with a hook or catch O, adapted to engage with a hook P on the frame of the machine. Either hook may be made yielding to permit disengagement from the other in order to release the carriage M; but we prefer to suspend the hook O from a pin or bolt, so that it will swing by gravity into engagement with hook P. We also by preference limit the movement of said hook or catch O by means of a pin or bolt passing through a slot formed in its body, and provide it with a handle $g$, by which it may be drawn outward and disengaged from hook P. This handle also enables the attendant to control the rise of the carriage and prevent the too violent impact of the glass carried by it against the grinding wheel or disk N, above mentioned, and affords a means of lowering the carriage manually when necessary. Thus if the glass break or if it be sufficiently ground before the normal grinding period has elapsed, or if for any other reason the attendant desires to manually lower any carriage and its glass, this may be done instead of waiting for it to be lowered automatically. So, too, if after the predetermined period of grinding a glass be lowered without being adequately ground the attendant can release the carriage and subject the glass to a second period of grinding.

Each carriage M comprises a cup or basin $h$, having a central tubular neck in which is seated a tubular stem $i$, the upper end of which is screw-threaded to receive the internally-threaded lower end or neck of a glass-holder or chuck $j$, which is usually in the form of a tapering hollow body lined with cork or other yielding substance adapted to bind and hold a glass placed within it. The central opening through the stem $i$ permits the holder to descend over and around an ejecting rod or stem $k$, fixed upon and rising from the bed of the machine or from a bracket projecting therefrom, as seen in Figs. 2, 3, 4, and 6. There is of course one ejecting-rod for each holder. Each cup or basin $h$ has a drain-pipe $l$ to carry off the water falling from the grinding disk or stone, which is kept wet during the grinding operation, as hereinafter further explained.

Mention has been made above of cams $c$, which depress the levers J, and thereby draw the carriages M downward, carrying the glasses away from the grinding wheels or disks. Each of these cams is so fashioned and set with reference to the bowl or roller $f$ of the lever which it controls as to bear thereon through approximately one-quarter of a revolution of the cam-shaft H, and as this is slowly turned through the worm-gear $a\ b$, the worm itself having a relatively slow rotation, it follows that the period represented by the remaining three-quarters of a revolution of shaft H, during which each carriage in turn is elevated and the glasses are being ground, is sufficient to properly dress and render true the mouth or edge of almost any glass.

It is desirable that after depressing its lever J each cam $c$ shall ride clear of the lever, leaving it free to rise when its carriage is unlocked, and that the cam shall then come to rest or cease its travel. To attain this end, we adopt the construction illustrated in Figs. 2, 4, 5, 10, and 11, which will now be explained.

Pinned or otherwise secured upon the cam-shaft H are collars $m$, between which is placed a sleeve $n$, having a radial flange $o$, provided with a cam or incline $p$ on its side face and having its end notched or toothed to constitute a clutch member, as will be readily understood upon referring to Figs. 5, 10, and 11. Formed with or preferably made separate from, but forced tightly upon the sleeve $n$, is the hub of a cam $c$, designed to turn with and as a part of the sleeve. Also encircling cam-shaft H and end to end with sleeve $n$ is a second clutch member or sleeve $q$, having teeth or projections to engage or enter the teeth or notches of sleeve $n$. Sleeve $q$ is feathered or splined upon the shaft, so that it may slide upon, but must rotate with the shaft. It is loosely encircled by a ring $r$, provided with gudgeons, which enter holes or sockets in the arms of a forked lever or yoke $s$, by which the sleeve $q$ is moved lengthwise of the shaft to effect clutching and unclutching with and from sleeve $n$. So long as the clutch members or sleeves are in engagement they will both rotate with shaft H, and the cam $c$, carried by sleeve $n$, will swing or circle about the shaft. When the parts are uncoupled, the sleeve $q$ will continue to rotate, but sleeve $n$ and cam $c$ will at once come to rest, owing to the friction produced by a brake or friction band $t$, which nearly encircles the hub of the cam and bears thereon with a pressure regulable by a draw-bolt $u$, which draws together the two arms or branches of said band, as indicated in Figs. 4 and 10. The friction is not sufficient to offer any considerable resistance to rotation of shaft H and cam $c$, but only enough to hold the cam at rest when disconnected from the shaft.

Yoke or lever $s$ is formed upon the depending arm of an elbow-lever Q, fulcrumed in a bracket beneath the bed or table of main frame A, and to the end of its horizontal arm is pin-jointed a rod or stem $v$, which passes upward through a hole in the table, is encircled by a spiral spring $w$, and is furnished above said spring with a nut $x$ and a jam-nut $y$, as seen in Figs. 4 and 5. Spring $w$ tends constantly to throw clutch-sleeve $q$ into locking engagement with sleeve $n$ and to hold it there; but this tendency is at proper times neutralized by the action of the incline $p$ of sleeve $n$, above referred to, upon or in connection with a latch $z$, carried by lever Q.

Latch $z$, which is illustrated in Figs. 2, 3, 5, and 10, is pivoted or fulcrumed at one end in lugs formed on yoke $s$, and is connected by a link $a'$ with a lever $b'$, pivoted to a lug formed upon the lever Q, as seen in Figs. 2, 5, and 10. Lever $b'$ has its free or movable end necked down into the form of a cylindrical pin or stem, which is inserted into a hole in a lever $c'$, pivoted at one end to a stud bolt or hanger $d'$, which is screwed into the under side of the bed or table of the machine. To the free end of lever $c'$ is pin-jointed an upwardly-extending catch or latch-bar $e'$, the upper extremity of which is fashioned into a hook $f'$, with an incline or wedge $g'$ shortly below the hook, all as well shown in Figs. 5 and 10.

The latch-bar $e'$ extends upward through a guide block or yoke $h'$, having its inner wall facing the incline or wedge $g'$ beveled or inclined to correspond, as seen in Fig. 10, and a spring $i'$, secured to the web of upright L, presses the latch-bar $e'$ outward and holds it in contact with this inclined outer wall of the guide or yoke $h'$, as shown in said figure.

When lever $c'$ is in its elevated position, the incline $g'$ bearing against the end wall of guide or yoke $h'$ causes the latch-bar $e'$ to be forced backward or inward against the resistance of spring $i'$, thereby carrying hook $f'$ clear of or vertically out of the path of a stud or lug $j''$ on the carriage M, as indicated in connection with the latch-bar $e'$ to the left in Fig. 5. When, however, lever $c'$ is lowered, as shown in connection with the right-hand group of devices in said Fig. 5, the wedge $g'$ no longer holds the latch-bar over to the right and the spring $i'$ forces it to the left, so that its hook $f'$ engages the stud $j''$, or will do so if the carriage M be sufficiently lowered.

The right-hand carriage M, clutch, and intermediate connections in Fig. 5 are represented in the positions they occupy when the carriage M is in its lowermost position, but with the clutch members in engagement, while the left-hand carriage is shown slightly elevated, latch $z$ resting upon the top of incline $p$ and the clutch members in engagement.

In Fig. 2 the like group of devices at the left hand is represented in the same relation as the right-hand group in Fig. 5; but the second group, counting from the left of the figure, shows the parts unclutched, and the group at the extreme right shows the latch $z$ raised and the clutch members just entered in engagement.

Since, as just explained, hook $f'$ of latch $e'$ engages stud $j''$ of carriage M when the carriage descends to its lowermost position, which it does under the action of cam $c$ upon bowl $f$ of lever J, it follows that when the attendant seizes handpiece $g$ of pendulous catch O and unlocking the carriage M permits it to ascend under the influence of counterweight K, latch-bar $e'$, levers $c'$ and $b'$, link $a'$, and consequently latch $z$, will all be lifted. Latch $z$, lying normally upon the top of sleeve $q$ with its free end against or close to flange $o$ of sleeve or collar $n$, as seen in the left-hand group in Fig. 2, will be forced back by incline $p$ to the position shown in the next group to the right, as the sleeve $n$, with its flange $o$ and incline $p$ and the cam $c$ rotate, and just before the end of the incline is reached the separation of the clutch members will be completed and sleeve $n$ and cam $c$ will come to rest. This occurs shortly after the cam $c$ completes the lowering of carriage M and when hook $f'$ is free to engage the stud $j''$ of carriage M. If now the attendant unlocks the carriage by lifting handpiece $g$ of latch O, the carriage will rise and lift latch $z$, as above explained, until said latch rising above and clear of the incline $p$ permits the clutch-sleeve $q$ to move longitudinally and to enter into engagement with the second clutch member under the influence of spring $w$. When this occurs, the sleeve $n$ and cam $c$ again begin to rotate, incline $p$ is quickly carried from beneath latch $z$, said latch falls to horizontal position, and when incline $p$ again rides against its end and forces back the latch, the yoke $s$, and sleeve $q$ the parts are unclutched and the cam $c$ comes to rest.

As above stated, the unclutching occurs shortly after the lowering of carriage M. Hence during the travel of cam $c$ from the point at which it clears bowl $f$ or a little beyond, around to the point at which the cam again begins to bear upon said bowl and to depress the lever J and thereby to lower the carriage M, said carriage will remain elevated and will cause the glass to be held and pressed against the grinding-wheel N. This period is proportioned to the amount of grinding ordinarily needed to true and smooth the edge or mouth of a glass.

To prevent the chucks or glass-holders from being carried into contact with the grinding wheels or disks, adjustable stops $k'$ are provided on the frames or standards L, as shown in Figs. 3 and 6. These engage projecting lugs on the carriages M and limit their rise, there being a stop for each carriage.

The grinding wheel or disk and attendant parts are best illustrated in Figs. 2, 3, and 6, the belting being also shown in Fig. 1.

Referring particularly to Fig. 6, the grinding wheel or disk N will be seen to be a circular disk or block of grinding material—as stone, emery, corundum, or the like—held in an inverted cup or recessed head R, having a tubular spindle $l'$, which turns in bushings $m'$, secured in brackets $n'$ $o'$ of the standards or upright extensions L of the main frame. Between the brackets $n'$ $o'$ the spindle $l'$ carries a belt-pulley $p'$ to receive a driving-belt which passes over idler or guiding pulleys $q'$ $r'$ to and about a driving-pulley or band-wheel D on the driving-shaft B, before mentioned. To grind the glass properly, it is necessary to supply the grinding and ground surfaces constantly with water. To do this, a supply-pipe S is carried across the upper ends of the standards L, and from this are extended upward and downward branches $s'$ and $t'$, each furnished with a cock $u'$. The upward branches $s'$ are each connected by tubing, preferably flexible, with a pipe or tube $v'$, of which there is one extending downward within each tubular spindle $l'$ to a point just below the grinding stone or disk N, where the delivery end is turned upward to direct the water upon the under face of the stone, as shown in Figs. 2 and 6. Each downward branch $t'$ is connected by flexible tubing with a nozzle $w'$, which directs a jet of water to the lower face of the grinding stone or disk N at or near its periphery. A shell or casing T confines the water from the nozzles and thrown off by the rapidly-rotating stone, the casing having a concave annular bottom with an opening sufficient to freely receive the mouth of the glass. A waste-pipe $x'$ carries away the water accumulating within the shell or casing T. As water accumulates within the glass U, being unable to escape between its mouth and the grinder N, it would, if not prevented, rise through the tubular spindle and flow down over the outside of the spindle and its supports. To prevent this action, which, in addition to causing a slop and rendering the work of the attendant very disagreeable, would carry grit into the bearings, we provide the stone or carrying-head R with channels $y'$—one or more—opening outward from the central passage of the spindle. Owing to the rapid rotation of the head R, the water rising through the central opening of the grinder is thrown outward by centrifugal force and discharged at the periphery of the head R within the shell or casing T and no water can ever rise within the spindle to its top. Suitable oil-cups $z'$, with tubes extending therefrom to the points requiring lubrication, are provided, as seen in Fig. 6.

The foregoing description applies to the machine in its more elaborate development, but within that disclosure can be made a less complicated structure of little, if any, less efficiency. This modification of the invention is illustrated in Figs. 12 and 13, where the cam-shaft H is represented as having cams $c^2$ directly and rigidly applied to it, one for each lever J, all clutching devices being dispensed with.

The cams $c^2$ are of the special form indicated in Fig. 12 and are designed, first, to depress the levers J one after another, then to hold the levers each in turn at rest for a brief period to facilitate the removal of a finished glass and the introduction of a new one, and, finally, by reason of the curvature of the rear face of each cam to permit the levers to rise gradually until the glasses come in contact with or in proximity to the grinding wheel or disk, at which times the cams ride free of the rollers $f$ and permit the weights K to press the glasses closely against the grinders and with proper force. The grinding of each glass will under this arrangement continue until the cam controlling its holder in its further revolution again makes contact with the roller *f* of its lever J, depresses said lever, and thereby draws down the glass-holder or chuck. Under this construction all clutches are dispensed with, and by proper proportioning of the gearing the duration of the grinding action will be made proportionate to the work to be performed.

The latches are not deemed necessary, but may be provided, if desired, so that any given glass-holder or chuck may be held out of action. In such case the latch should be made to work somewhat stiffly, so that when not needed it may be withdrawn from operative position and held there by the friction of the joint or pivot or in any other convenient manner, so that ordinarily the machine may operate automatically to raise and lower the chucks or glass-holders periodically.

The machine being constructed as above first set forth, the several carriages are lowered and locked, a glass is inserted in each holder, and each carriage is in turn released. As each carriage rises its cam is clutched and set in motion, the grinding begins and continues until the cam lowers the carriage or until stop $k'$ arrests the rise of the carriage, and, finally, the cam lowers the carriage, causing it to be locked in lowered position, where it remains until the attendant removes one glass, supplies another, and the action is repeated, this being done with each carriage in turn.

With the machine constructed as in Fig. 12—that is to say, with the cams fixed upon the shaft—the same mode of operation may be adopted, if desired; but it is deemed more satisfactory to permit the cams to raise and lower the glass-holders or chucks periodically and without locking them in the lowered position. Greater rapidity is attained under this mode of operation and the construction is also simpler than where clutches are employed and may be rendered still simpler by omission of the latches, as suggested.

It is found that one attendant can supply and remove glasses to and from four carriages, but that such number is about as many as it is advantageous to assign to one person. However, we may use any number of carriages, grinders, &c., from one upward.

Various modifications may be made in the details of the machine—as, for instance, in the manner of driving, in the form and construction of the clutches, in the character of the glass-holders, &c.—without departing from the spirit of the invention.

By arranging the glass-holders in upright position the glasses are more easily placed in and removed from said holders and there is less liability of their falling out during the adjustment of the carriages. The machine also occupies less floor-space and generally is more convenient than where the holders are placed in horizontal position, as has heretofore been done.

A trough or receptacle is usually placed beneath the waste-pipes to catch the water discharged from the grinding-wheels; but this of course constitutes no feature of the invention.

It has been found advantageous to mount the levers J upon roller-bearings to render their action prompt and easy and to enable them to respond to comparatively slight pressure.

As above intimated, the channels for the discharge of water rising within the central tube or pipe may be formed either in the carrying-head or in the grinding-stone itself, and they may be in the form of tubular passages or mere grooves formed in a face of the stone or of the head. They may be straight, curved, or angular. If desired, both the carrying-head and the stone may be furnished with such channels. Ordinarily it will be found advisable to provide several such passages or channels extending from the center to the circumference of the stone or the carrying-head; but a single one will be sufficient if made of adequate size.

Figs. 6 and 8 illustrate the arrangement of water-discharge passages in the head or carrier in which the grinder is mounted.

Fig. 14 shows in several forms the grooves or channels produced directly in the face of the grinding-disk itself.

Figure 1:
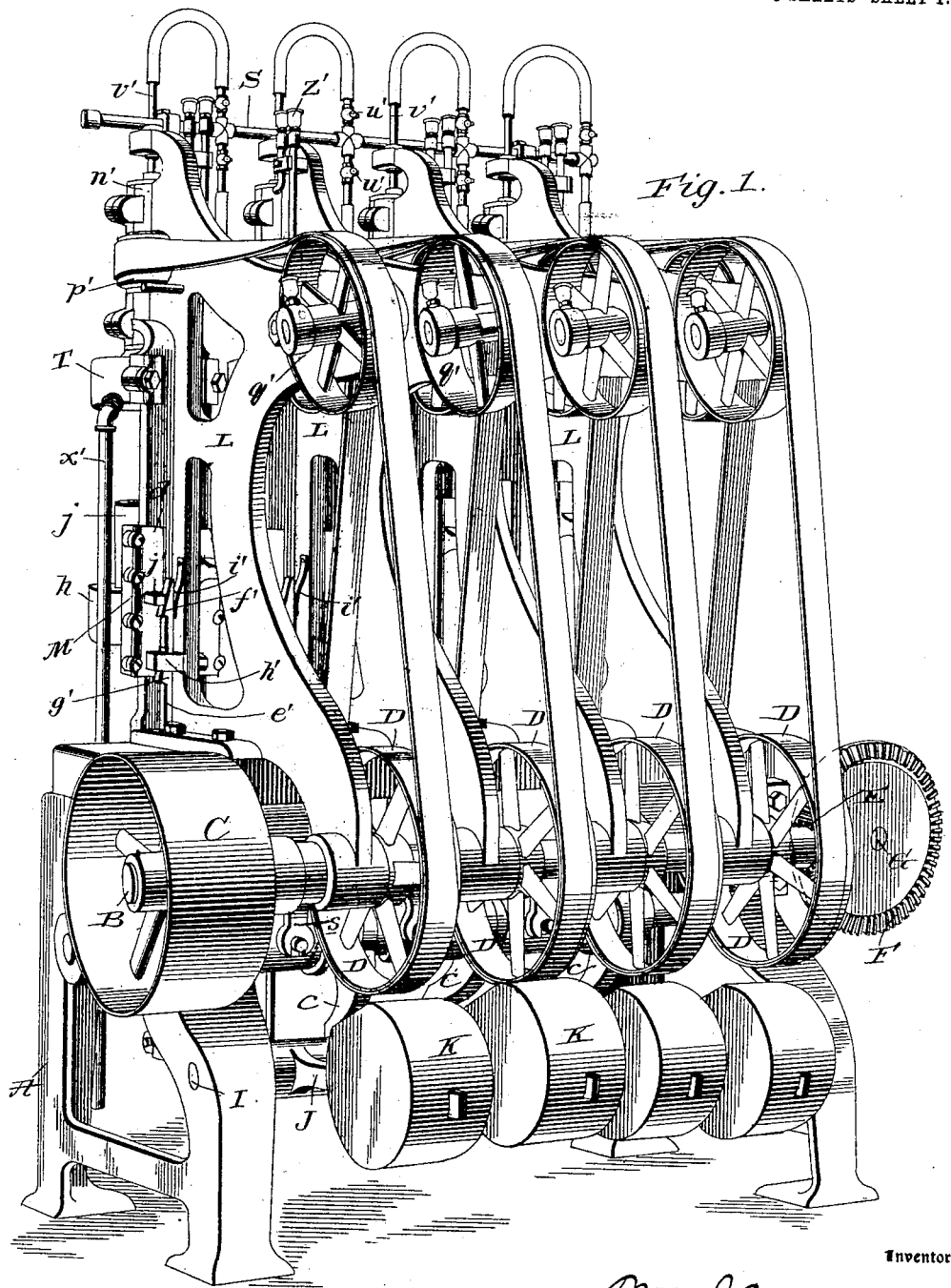
Figure 12:
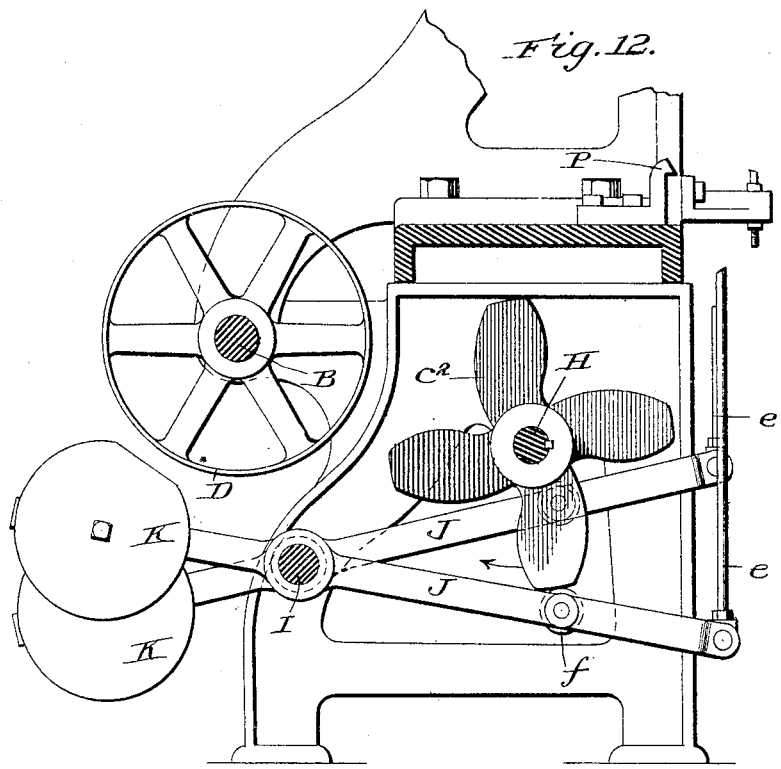
Figure 13:
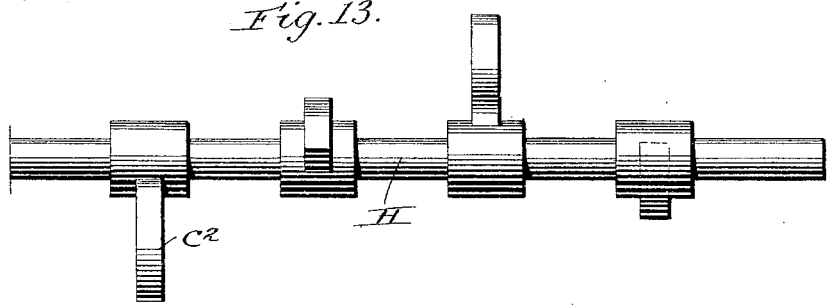

The cams $c$ used in connection with the clutching devices may, if desired, be made of the same form as the cams $c^2$ of Fig. 12, in which case they would serve to control the rise of the levers J and chucks or glass-holders after the latches are released, thus rendering unnecessary further care of the attendant to guard against the too sudden rise of the chucks and the consequent injury of the glasses.

Having described our invention, what we claim is—

1. In combination with a grinding-wheel and a chuck or holder movable toward and from said wheel and adapted to carry a glass, a stationary rod extending through the base of the chuck and adapted when said chuck is lowered to engage the glass and arrest its movement while the chuck makes further descent, thereby starting the glass from its seat.

2. In combination with a grinding wheel or disk, a glass-holder or chuck adapted to contain a glass and present it to the grinding-surface; a water-supply pipe passing through the grinding-wheel and arranged to deliver water within the boundaries of the glass; and a head or carrier for the grinding-wheel provided with one or more passages extending from the central opening of the head to the circumference thereof, whereby water rising within the central opening is discharged at the periphery of the head, substantially as set forth.

3. In combination with a grinder N, and its carrying-head R, provided with a tubular spindle $l'$, and with passage $y'$, extending from the interior of the tubular spindle outward; water-supply pipe $v'$ adapted and arranged to deliver water within the boundaries of the glass being ground; a glass-holder or chuck $j$, adapted to contain and hold a glass and to be moved toward and from the grinding wheel or disk N, substantially as set forth.

4. In combination with a grinder and means for rotating the same, a carriage movable toward and from the grinder and provided with a chuck or glass-holder; means, substantially such as described, for elevating the carriage; and a catch adapted to hold the carriage in a depressed position and prevent its elevation, substantially as set forth.

5. In a machine for grinding glasses, the combination of a grinder; means for rotating said grinder; a carriage movable toward and from the grinder, and provided with a glass-holder or chuck; a counterweighted lever connected with and serving to elevate the carriage; a cam arranged to act upon and depress the lever and with it the carriage; and a hook or catch serving when the carriage is depressed to lock and hold the same in its depressed position.

6. In a glass-grinding machine, the combination of a grinding-wheel, and means for rotating the same; a carriage movable toward and from the grinder, and provided with a chuck or glass-holder; means substantially such as described for elevating the carriage; means for periodically lowering the carriage; and a hook or detent carried by the carriage and adapted to lock it in its lowermost position, said hook being provided with a handpiece by which it may be withdrawn and the carriage raised or lowered, as set forth.

7. In combination with a grinder adapted to rotate but held against other movement, a carriage movable toward and from the grinder, and provided with a chuck or glass-holder; and an adjustable stop located in the path of the carriage and adapted to be rigidly secured at any desired adjustment, whereby the approach of the chuck toward the grinder is limited and the extent of grinding is determined.

8. In combination with grinder N, and carriage M, provided with chuck $j$; adjustable stop $k'$, adapted to arrest the carriage in its approach toward the grinding-wheel.

9. In a grinding-machine, the combination of a grinding-wheel; means for rotating the same; a carriage movable toward and from the grinder, and provided with a chuck or glass-holder; a counterweighted lever connected with and serving to elevate the carriage; a cam adapted to act upon and depress said lever; a rotary shaft carrying said cam; a clutch for connecting the cam to and disconnecting it from its shaft; and automatic mechanism, substantially such as described, for unclutching the cam when its shaft has rotated a given distance.

10. In combination with a grinder, a carriage movable toward and from said grinder, and provided with a glass-holder or chuck; a counterweighted lever connected with and serving to elevate said carriage, and provided with a chuck or glass-holder; a rotary shaft; a cam loosely encircling said shaft; a clutch carried by said shaft, adapted to rotate therewith and to be engaged with the rotary cam; means for automatically unclutching the cam when it has rotated a predetermined distance; and a friction device for holding the cam against rotation when unclutched.

11. In a grinding-machine, the combination of a grinder; a carriage movable toward and from the grinder, and provided with a chuck or glass-holder; a lever for elevating and lowering said carriage; a rotary shaft; a cam having a hub or sleeve loosely encircling said shaft, provided with a clutch member and having an incline or cam projection at one end; a second clutch member slidable upon the shaft but splined to rotate therewith; a shifting-lever for the movable clutch member; a spring acting upon said lever and tending normally to effect engagement of the clutch members; a latch carried by said lever, lying normally in the path of the incline or cam projection and adapted to be lifted above the same; levers connected with said latch for lifting the same; and a latch-bar connected with the levers and adapted to engage the carriage which carries the glass-holder or chuck and to be lifted therewith, substantially as described, whereby the latch is caused to force back the shifting-lever and disconnect the clutch members when the incline rides against the end of the latch, and whereby also the latch may be lifted free of the incline to permit the parts to reënter into engagement.

12. In a glass-grinding machine, the combination of a grinder; a carriage movable toward and from the grinder and provided with a glass-holder or chuck; a lever for moving said carriage toward and from the grinder; a cam for moving said lever in one direction; a clutch for connecting said cam with its driving-shaft and disconnecting it therefrom; automatic devices for separating the clutch members; a latch-bar connected with the automatic clutch-separating devices, and provided with hook $f'$, and incline $g'$, the former adapted to engage with a lug or projection of the glass-holder carriage; a spring $i''$, acting upon the latch-bar and tending to throw its hook into engagement with said lug or projection; and a guide or yoke $h'$, through which the incline $g'$ passes, and which, acting in conjunction with the incline, serves to disengage the hook $f'$ from the latch when the latter is lifted a given distance.

13. In combination with a suitable frame having upright standards provided with guideways, rotary grinders carried one by each standard; a series of vertically-movable carriages, one mounted upon the guideways of each standard; a series of counterweighted levers connected with and serving to elevate said carriages; and a rotatable shaft provided with a series of cams, one for each lever, adapted periodically to depress the several levers in turn and thereby to lower the carriages successively.

14. In a glass-grinding machine, the combination of a reciprocating carriage provided with a glass-holder or chuck, and having a central perforation; a fixed support below said carriage; and a rod or stem adjustably mounted in said support and extending through said central perforation and into the chuck or glass-holder, substantially as and for the purpose set forth.

15. In a glass-grinder, the combination of a grinding-wheel; a head or holder therefor, provided with a tubular spindle; a shell or casing encircling said spindle; a glass-holder or chuck movable toward and from the grinder; a water-pipe extending through the tubular spindle and adapted to discharge water upon the under face of the grinder within the boundaries of the glass; and a nozzle extending through the shell or casing and adapted to deliver water to the face of the grinder outside the boundaries of the glass.

16. The herein-described glass-grinding machine, comprising a main frame A, a driving-shaft B mounted in bearings in said frame and provided with a driving-wheel C, band-wheels D, and beveled pinion E; shaft G provided with bevel-gear F, and worm $a$; shaft H provided with wheel $b$, to mesh with worm $a$, and with a series of cams $c$; levers J, provided with counterweights K; carriages M, provided with chucks or glass-holders $j$, and connected with the levers J; grinders N, provided with pulleys $p'$; and driving-belts passing about band-wheels D, pulleys $p'$, and intermediate wheels $q'$, $r'$, substantially as described and shown.

17. In combination with a grinder N, movable carriage M, provided with a glass-holder or chuck; lever J; counterweight K carried by said lever; rod or link $e$, connecting the lever with the carriage M; bowl or roller $f$ carried by the lever J; shaft H; and cam $c$ carried by said shaft, adapted to bear upon the bowl or roller $f$, and to depress the lever and then to ride free of the same so that the lever may rise and move past the cam while the latter is in its downward position.

18. In combination with a chuck or holder adapted to contain a glass and present it to a grinding-disk, a grinding-disk provided with radial channels; and a water-supply pipe arranged to deliver water within the boundaries of the chuck or its contained glass, the radial channels serving to carry off the water rising within the glass.

19. In a machine for grinding glasses, the combination of a grinder; a chuck or glass-holder; a lever connected with said chuck or glass-holder; a counterweight serving to elevate one end of said lever and with it the chuck or glass-holder to carry and hold the glass against the grinder; and a cam adapted to act upon and depress said lever to withdraw the chuck and glass from the grinder, and curved on its rear face, substantially as described, to cause the rise of the lever to take place gradually and under the control of the cam.

In testimony whereof we have signed our names to this specification in the presence of two subscribing witnesses.

WALTER J. MUNCASTER.
LAWRENCE A. FLETCHER.

Witnesses:
GEORGE STEGMAIER,
JOHN E. ZILCH.